United States Patent [19]

Bray

[11] 4,021,351

[45] May 3, 1977

[54] MEMBRANE CARTRIDGE WITH IMPROVED CENTRAL COLLECTION TUBE

[75] Inventor: Donald T. Bray, Escondido, Calif.

[73] Assignee: Desalination Systems, Inc., Escondido, Calif.

[22] Filed: Oct. 30, 1975

[21] Appl. No.: 627,078

[52] U.S. Cl. .................... 210/232; 210/433 M; 210/494 M

[51] Int. Cl.² ...................................... B01D 31/00

[58] Field of Search ......... 210/433 M, 494 M, 497, 210/321 R, 232

[56] References Cited

UNITED STATES PATENTS

| 3,406,831 | 10/1968 | Bush et al. | 210/497 X |
| 3,417,870 | 12/1968 | Bray | 210/494 X |
| 3,695,446 | 10/1972 | Lyall et al. | 210/321 R |
| 3,786,925 | 1/1974 | Block et al. | 210/321 R |

Primary Examiner—Frank A. Spear, Jr.
Attorney, Agent, or Firm—Clement H. Allen

[57] ABSTRACT

A spiral wound reverse osmosis or ultrafiltration membrane cartridge has a central collection tube fabricated from a plurality of interlocking segments; the center segments are perforated and the segment at each end is imperforate. The side edges of the cartridge membrane leaves and the permeate transfer sheet are sealingly attached to the central collection tube by circumferential bands of glue located outboard of the juncture of the imperforate end segments with adjacent perforate center segments. Substantial fabrication economies result from injection molding the center segments as identical bodies from a single die; and injection molding the end segments also as identical bodies from a single die.

4 Claims, 8 Drawing Figures

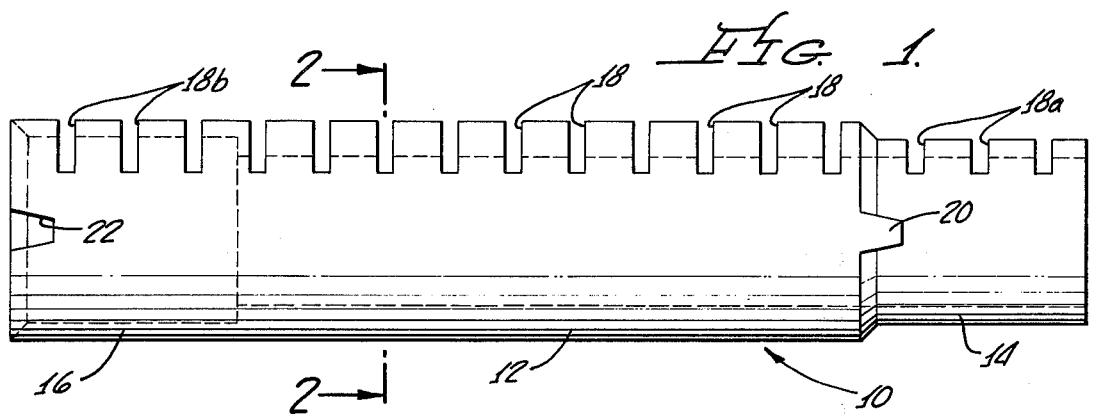
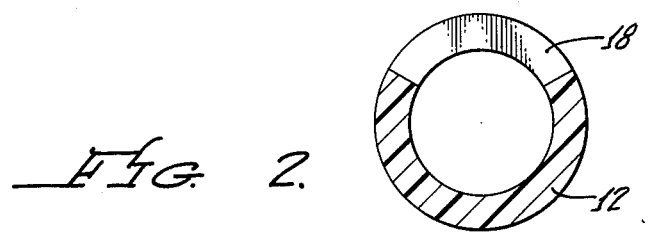
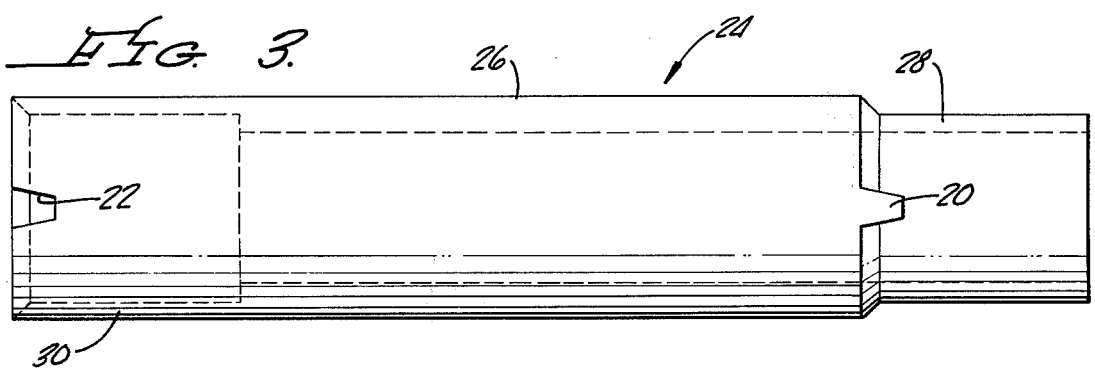
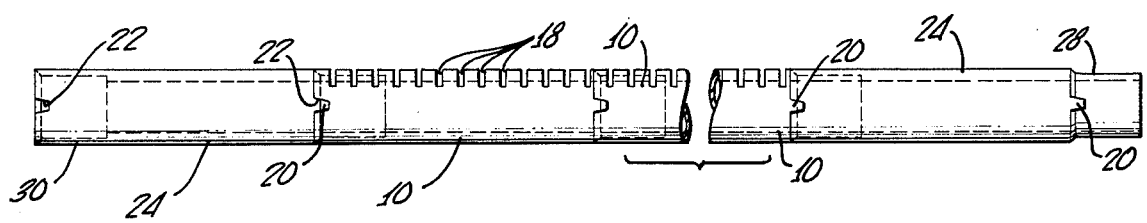

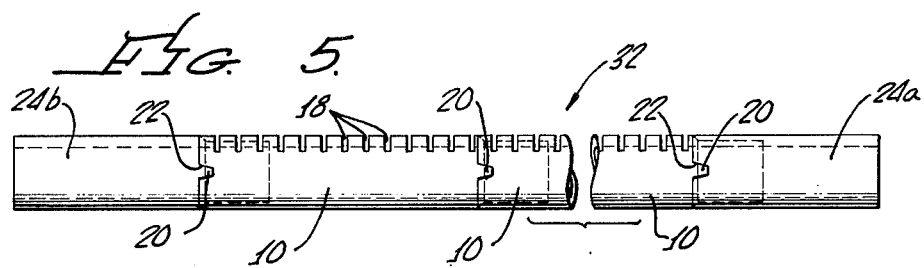
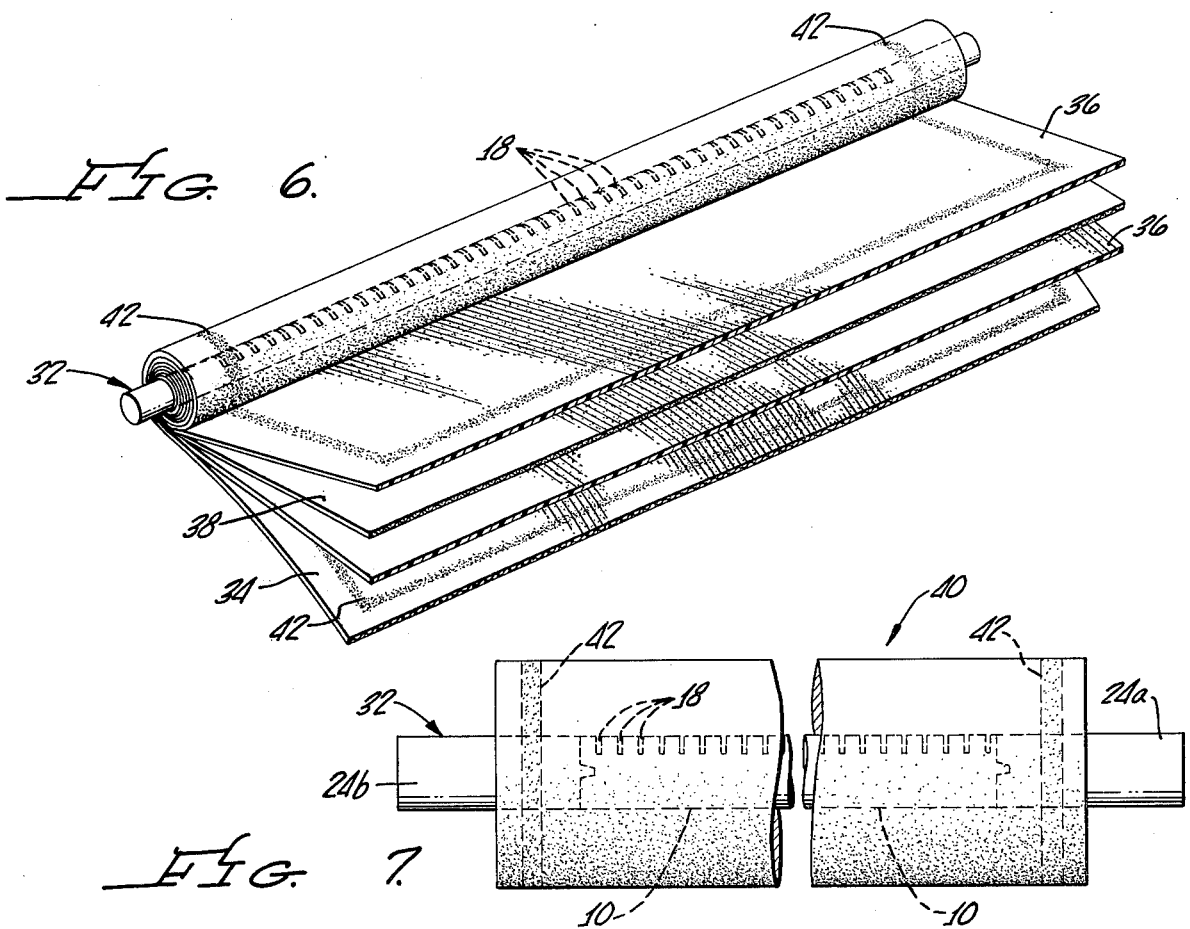
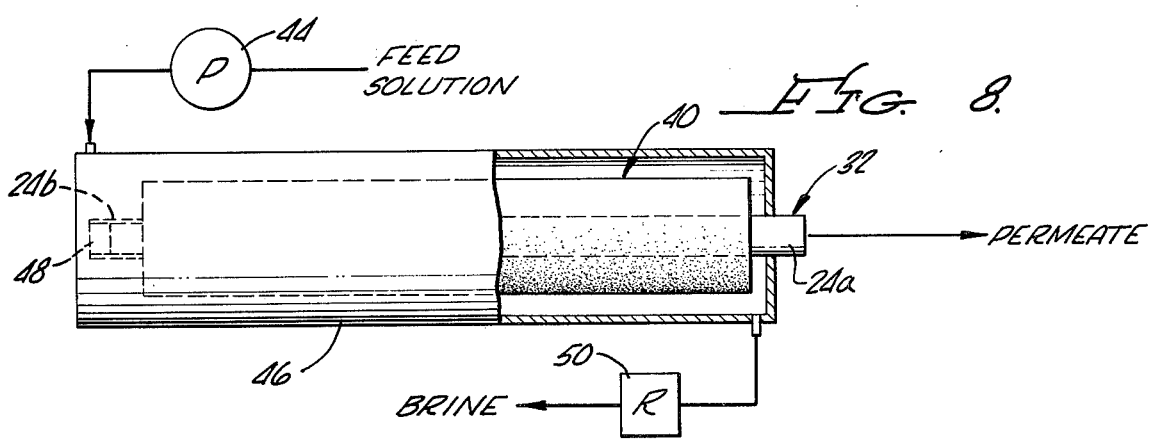

MEMBRANE CARTRIDGE WITH IMPROVED CENTRAL COLLECTION TUBE

BACKGROUND OF THE INVENTION

1. The Field of the Invention

This invention relates to a reverse osmosis or ultrafiltration membrane cartridge having an improved central collection tube.

2. The Prior Art

Reverse osmosis and ultrafiltration membrane cartridges have often been produced by winding a membrane leaf or leaves, a permeate transfer sheet, and a spacer sheet around a perforated central collection tube. The permeate transfer sheet collects permeate passing through the membrane leaf or leaves for passage through perforations or apertures in the collection tube into its interior, and thence through the collection tube out of the pressure resistant casing in which this may be housed, to facilities for use, disposal or storage. Such cartridges are known as spiral wound cartridges and are described in U.S. Pat. Nos. 3,417,870; 3,493,496; and 3,542,203, among others.

The collection tube in a spiral wound cartridge should be fabricated of relatively rigid material, preferably a strong plastic such as polyvinyl chloride, since it is the central hub or core around which the other cartridge elements are wound. Additionally, it must be provided with a series of perforations or apertures for transfer of permeate from the permeate transfer leaf into the interior of the collection tube. These perforations must be of such dimensions that adequate permeate flow-through is provided while a generally smooth outer tube surface is maintained for membrane pack support. Preferably, the perforations are in the form of small holes or transverse slits. These requirements have heretofore been met by a central collection tube fabricated from a continuous length of commercially produced plastic tubing in which the required number of transfer passages are provided by drilling holes or milling slits through the tube wall. While the raw material, that is the plastic tubing, is not very expensive, the labor required for drilling or milling the number of transfer holes or slits needed is great, and the total cost of the finished central collection tube is high. A central collection tube construction which could be more readily and economically fabricated would be advantageous for production of spiral wound membrane cartridges for reverse osmosis or ultrafiltration systems.

SUMMARY OF THE INVENTION

Summarized briefly, this invention comprises a membrane cartridge having a central permeate collection tube with a membrane leaf or leaves, a permeate transfer sheet, and a spacer sheet spirally wound around the permeate collection tube. The side and end edge areas of the membrane leaf and of the permeate transfer leaf are sealingly attached to each other and to the permeate collection tube. The permeate collection tube, according to this invention is fabricated from a plurality of interlocking tubular segments. Each segment has at one end a smaller outside diameter extension whose inner surface is flush with the inner surface of the segment, and at the other end, a larger inside diameter extension whose outer surface is flush with the outer surface of the segment, so that an extension at one end of a segment can telescope into and mate with the extension at the end of an adjacent similar segment. Each of the end extensions on each segment is of wall thickness substantially one-half the wall thickness of the body of the segment. A number of segments are assembled with the smaller diameter extension of each snugly telescoping into and mating with the larger diameter extension of the adjacent segment to form a complete tube, preferably of greater than required length. Each of the segments constituting the center or main body of the complete tube, is provided with permeate transfer perforations or apertures, preferably in the form of narrow transverse slits, these being spaced longitudinally along each segment, including its extensions, so that when one segment is mated with another, the perforations or slits in the larger diameter extension of one segment will overlie the perforations or slits in the smaller diameter extension of the adjacent segment. Register or indexing of the perforations in mating segment extensions is ensured by provision of a tongue or protuberance on one extension of configuration to lock with a groove or cavity in the extension with which it is mated; these being located to maintain proper rotational alignment of the overlapping segment extensions.

The segments at the ends of the assembled tube are fabricated without transfer apertures to form imperforate outlet or end tubes. The extension of the end segments may be sawn off to provide a tube without different internal and external diameter and extensions. The fact that these extensions may be different in that a smaller diameter one may be at one end and a larger diameter one may be at the other end will then be immaterial, and the end segments as originally fabricated may be of identical configuration and produced by molding from the same die.

The collection tube is preferably assembled from identical center segments produced from a single die by injection molding of a suitable plastic. The tube end segments are also preferably produced from a single die by injection molding, being characterized by solid walls without perforation. Substantial fabrication savings are thereby effected, the loss of material and labor resulting from sawing off the ends being insignificant compared to the saving resulting from injection molding bodies or pieces for the complete structure from only two dies.

The membrane leaves, permeate transfer sheet and spacer sheet are wound around the collection tube with sides of the transfer sheet and the membrane leaves glued to the collection tube outboard of, or nearer the ends of the collection tube, than the junctures of the end segments of the collection tube with adjacent perforated center segments.

BRIEF DESCRIPTION OF THE DRAWINGS

In the drawings:

FIG. 1 shows a side view of a center segment of the collection tube of a membrane cartridge embodying features of this invention.

FIG. 2 shows a vertical cross section of the segment of FIG. 1 taken along the line 2—2.

FIG. 3 shows a side view of an end segment of the collection tube of a membrane cartridge embodying features of this invention.

FIG. 4 shows a reduced side view of a complete central collection tube assembled from segments of FIGs. 1 and 3.

FIG. 5 shows the collection tube of FIG. 4 with end segment extensions removed.

FIG. 6 shows the manner in which membrane leaves, permeate transfer sheet and spacer sheet are wound around the collection tube.

FIG. 7 shows a side view of a cartridge produced by winding the membrane leaves, permeate transfer sheet and spacer sheet around the collection tube of FIG. 5.

FIG. 8 shows, diagramatically, a semipermeable membrane cartridge of this invention in operation in a reverse osmosis or ultrafiltration system.

DESCRIPTION OF A PREFERRED EMBODIMENT

Referring now to FIGS. 1 and 2, a center segment 10 of the collection tube of the membrane cartridge comprises a generally tubular body 12 having a reduced outside diameter extension 14 at one end and an enlarged inside diameter extension 16 at its other end. The wall thickness of each of extensions 14 and 16 is substantially one-half the wall thickness of body 12, so that a number of segments may be assembled in end to end relationship with the smaller outside diameter extension of each segment telescoping into and mating with the larger inside diameter extension of the adjacent segment as will be seen in FIG. 4, to be discussed in more detail hereinafter.

Each center segment, as illustrated in FIG. 1, is provided with a plurality of perforations or apertures 18 through its wall, preferably, as shown, in the form of transverse slits, these perforations being spaced longitudinally along the length of segment 10, including extensions 14 and 16, so that perforations 18a in extension 14 of one segment will accurately correspond with complementary perforations 18b in extension 16 of the adjacent segment with which it is mated. Rotational alignment is maintained to ensure indexing or registering of the perforations in the overlying and underlying segment extensions by provision of means such as a protuberance or tongue 20 on one end, as of extension 14, which will engage or lock into a cavity or groove 22 in the extension 16 of an adjacent segment 10.

Referring now to FIG. 3, an end segment 24 of the collection tube is shown and which comprises a body 26 of diameter and wall thickness similar to that of central segment 10, and with end extensions 28 and 30 similar to center segment extensions 14 and 16, respectively, except that it has an imperforate wall. Tongue 20 and groove 22 are identical with these center segments 10.

Segments 10 and 24 may be of length and diameter so that each may be readily produced as identical bodies from suitable plastic by injection molding. The relative lengths of the end and center segments may be influenced by manufacturing and assembly considerations.

A number of center segments 10 and two end segments 24 are snugly telescoped and assembled end-to-end to produce a complete collection tube as seen in FIG. 4. Each tongue 20 locks into or engages the groove 22 in the extension 16 of an adjacent center segment 10, and in a groove 22 in extension 30 of one end segment with tongue 20 of the other end segment locking into groove 22 of its adjacent center segment 10. Locking of tongues 20 into grooves 22 aligns perforations 18a in the smaller diameter extensions 14 with overlying perforations 18b in extensions 16 to form aligned perforations through these extensions corresponding to perforations 18 in main body 12. The outside diameter of extension 14 of center segments 10 and extensions 28 of end segments 24 should be only slightly smaller than the inside diameter of extensions 16 and 30, respectively, of these segments, so that a snug, but not necessarily tight, fit is obtained when these are telescoped together. The fit, however, need not be liquid tight for reasons explained hereinafter. Snug fit is desirable so that the assembled central collection tube will be longitudinally rigid. Preferably, the segments are assembled without sealant or adhesive between segments. A sealant is not required because leakage will be immaterial, and sufficient strength and rigidity will be obtained by interlocking action without an adhesive.

FIG. 5 shows the assembled collection tube 32 with its projecting segment extensions 28 and 30 removed or sawn off to separate these and to provide uniform and full wall collection tube ends. This makes possible use of a single die for injection molding the end segments, identical segments being employed at both ends of the central tube assembly. It will be apparent from FIGS. 1, 4 and 5 that perforations 18 are generally aligned in each center segment. These perforations are also generally aligned when the center segments are assembled as shown. This ensures a longitudinal band of assembled collection tube surface free from perforations for adhesive attachment of the inner end of the permeate transfer sheet 34.

The method of rolling the cartridge is illustrated in FIG. 6, while the finished cartridge is shown in FIG. 7. Referring to FIG. 6, which is shown with leaves and sheets sectioned at their ends to indicate material, a permeate transfer sheet 34, which may be of porous woven material, has its inner end glued to the surface of collection tube 32 spaced from the slits 18 and covering these, and its side edges glued to the collection tube surface and to the adjacent edge surfaces of membrane leaves 36. Between the facing surfaces of membrane leaves 36, which is actually one leaf folded at its inner end, is placed spacer leaf 38, which is of plastic mesh to allow flow of liquid to be treated endwise through the cartridge 40 and across surfaces of membrane leaves 36. Permeate passing through membrane leaves 36 travels through permeate transfer sheet 34 inwardly toward the center of cartridge 40 and through slits 18 into the interior of collection tube 32. Side glue lines or bands 42 seal the side edges of the permeate transfer sheet 34 and the adjacent areas of membrane leaves 36 to the surface of collector tube 32. These glue lines should be placed outboard (that is outside or nearer the ends of the collection tube) of the juncture of center segments 10 with end segments 24, including any parts of the indexing assembly such as tongues 20 and groove 22. The longitudinal (end) glue line will be such that an end portion of permeate transfer leaf 34 (not glued) covers slits 18 (including, of course, 18a and 18b), while the end is sealingly glued to the surface of collection tube 32. This provides communication for transfer of permeate through transfer leaf 34 through slits 18 into the interior of collection tube 32. The glue lines 42 at the side edge areas seal side edges of permeate transfer leaf 34 and side edges of membrane leaves 36 to each other and to the surface of collection tube 32 so that all slits 18 (and 18a and 18b) are within the side glue lines and any leakage or space between segments 10 and 24 will act as additional apertures for transfer of permeate from permeate transfer leaf 34 to the interior of collection tube 32. Thus, the segments 10 and 24 need no sealing at their junctures, the complete collection tube 32 being simply fitted snugly together with the segments in telescoping engagement.

Referring now to FIG. 8, the membrane cartridge 40 is illustrated diagramatically in operation in a reverse osmosis or ultrafiltration system. A feed solution, for example brackish water, is introduced into high pressure pump 44, which forces feed solution into one end of a pressure resistant container 46, in which is housed a semipermeable membrane cartridge 40 according to this invention. An outlet tube 24a, which is one end of the cartridge central collection tube 32, as hereinbefore described, passes, sealed, through one end of pressure resistant container 46, the other end of tube 32, that is end 24b, is suitably plugged as at 48. Permeate, which may be purified water, flows out of collection tube end 24a. Brine, which results from separation of purified solution from the feed, is released from the other end of pressure resistant container 46, that is the end remote from introduction of the feed, through a resistor or other conventionally controlled-pressure release device 50.

The membrane cartridge of this invention may be produced at substantially less cost than conventional cartridges wound around a unitary central collection tube having bored or milled permeate transfer apertures. The collection tube segments may be produced by injection molding a suitable plastic such as polyvinyl chloride; and only two dies or molds are required, since the two end segments and the center segments may each be produced as described from single dies. The length of each segment may be selected for convenient molding and for rigidity in the assembled tube. It is a significant advantage that the segments as described may be assembled without calking, sealant or adhesve between segments. Any leakage at the junctures of segments will simply transfer permeate to the interior of the collection tube, and will act in the same manner as the perforations or slits provided for this purpose. The side glue lines where the permeate transfer sheet is attached to the collection tube must, however, be outboard or nearer the ends of the collection tube than the juncture of the end segments of the collection tube with the center segments, so that there will be no leakage outside the collection tube area covered by the permeate transfer sheet and sealed thereto by end and side edge glue lines.

Unexpectedly, the membrane cartridge of this invention will operate efficiently; and its central collection tube, assembled from interlocking segments and produced at low cost by injection molding, will function as well as a collection tube fabricated as a unitary body from plastic tubing, with permeate transfer perforations drilled or milled through its wall. Telescoping end sections of each segment provide quick and accurate assembly to provide a tube possessing required rigidity for pressure operation. There is no need for gluing segments together, provided that the membrane and transfer sheet glue line is outboard of the end to center segment junctures, any leakage through the segment junctures will be similar to flow through transfer apertures.

I claim:

1. A membrane cartridge having a central permeate collection tube with a membrane leaf, a permeate transfer sheet, and a spacer sheet spirally wound around said central permeate collection tube, and having side edge areas of said membrane leaves and of said permeate transfer sheet sealingly attached to each other and to said central permeate collection tube; in which the improvement comprises:

a. said permeate collection tube fabricated from a plurality of interlocking tubular segments fitted together end-to-end, each of the center segments of said permeate collection tube having a plurality of perforations longitudinally spaced and generally aligned along its length, said perforations also being generally aligned after assembly of said center segments, and the end segments of said central permeate collection tube being imperforate; and, b. the side edge areas of said membrane leaf and said permeate transfer sheet being sealingly attached to said permeate collection tube by circumferential glue lines located outboard of the junctures of the said end segments of said permeate collection tube with adjacent perforated center segments of said permeate collection tube.

2. A membrane cartridge according to claim 1, in which each of said interlocking segments of said central permeate collection tube has a reduced external diameter extension at its one end, and an enlarged internal diameter extension at its other end, said reduced external diameter extension of one segment being of diameter to snugly fit and mate with the enlarged internal diameter extension of an adjacent segment.

3. A membrane cartridge according to claim 2, in which indexing means maintain the reduced diameter extensions of center segments with perforations aligned with overlying extensions of adjacent segments.

4. A membrane cartridge according to claim 3 in which said indexing comprise a tongue on one extension of each of said segments, and a groove on the other extension of each of said segments, to mate with said tongue on the extension of an adjacent semgment.

* * * * *